United States Patent
Kozaki et al.

[11] Patent Number: 6,042,506
[45] Date of Patent: Mar. 28, 2000

[54] AUTOMATIC TRANSMISSION CONTROL HAVING VARIABLE FLUID PRESSURE DECREASING RATE AT GEAR SHIFTING

[75] Inventors: Tetsuji Kozaki, Chita-gun; Tsutomu Tashiro, Nagoya, both of Japan

[73] Assignee: Denso Corporation, Kariya, Japan

[21] Appl. No.: 09/189,628

[22] Filed: Nov. 10, 1998

[30] Foreign Application Priority Data

Nov. 10, 1997 [JP] Japan ................................. 9-307559

[51] Int. Cl.[7] .......................... F16H 61/06; F16H 61/08
[52] U.S. Cl. ......................... 477/148; 477/149; 477/154
[58] Field of Search ................................. 477/148, 149, 477/154, 155, 164

[56] References Cited

U.S. PATENT DOCUMENTS

| | | | |
|---|---|---|---|
| 4,527,678 | 7/1985 | Pierce et al. | 477/154 X |
| 5,085,105 | 2/1992 | Wakahara et al. | 477/148 |
| 5,443,427 | 8/1995 | Ataka et al. | 475/123 |
| 5,643,124 | 7/1997 | Sugiyama et al. | 475/123 |

FOREIGN PATENT DOCUMENTS

B2-5-81793 of 0000 Japan.

OTHER PUBLICATIONS

U.S. application No. 08/764,604, Kozaki et al., filed Dec. 11, 1996.

*Primary Examiner*—Sherry L. Estremsky
*Attorney, Agent, or Firm*—Nixon & Vanderhye P.C.

[57] ABSTRACT

A vehicle automatic transmission control controls fluid pressure changes applied to a frictional engagement element which is being changed from an engaged state to a disengaged state at a stage before input shaft rotational speed starts to increase from the beginning of a down-shift control. The control instruction value is set to gradually decrease the applied fluid pressure and to increase the ratio of such decrease with elapsed time. Specifically, a solenoid is used to control the fluid pressure applied to a clutch. The duty-cycle instruction for the solenoid is determined based on a quadratic function expressed as: duty cycle value=initial value$-at^2$.

14 Claims, 13 Drawing Sheets

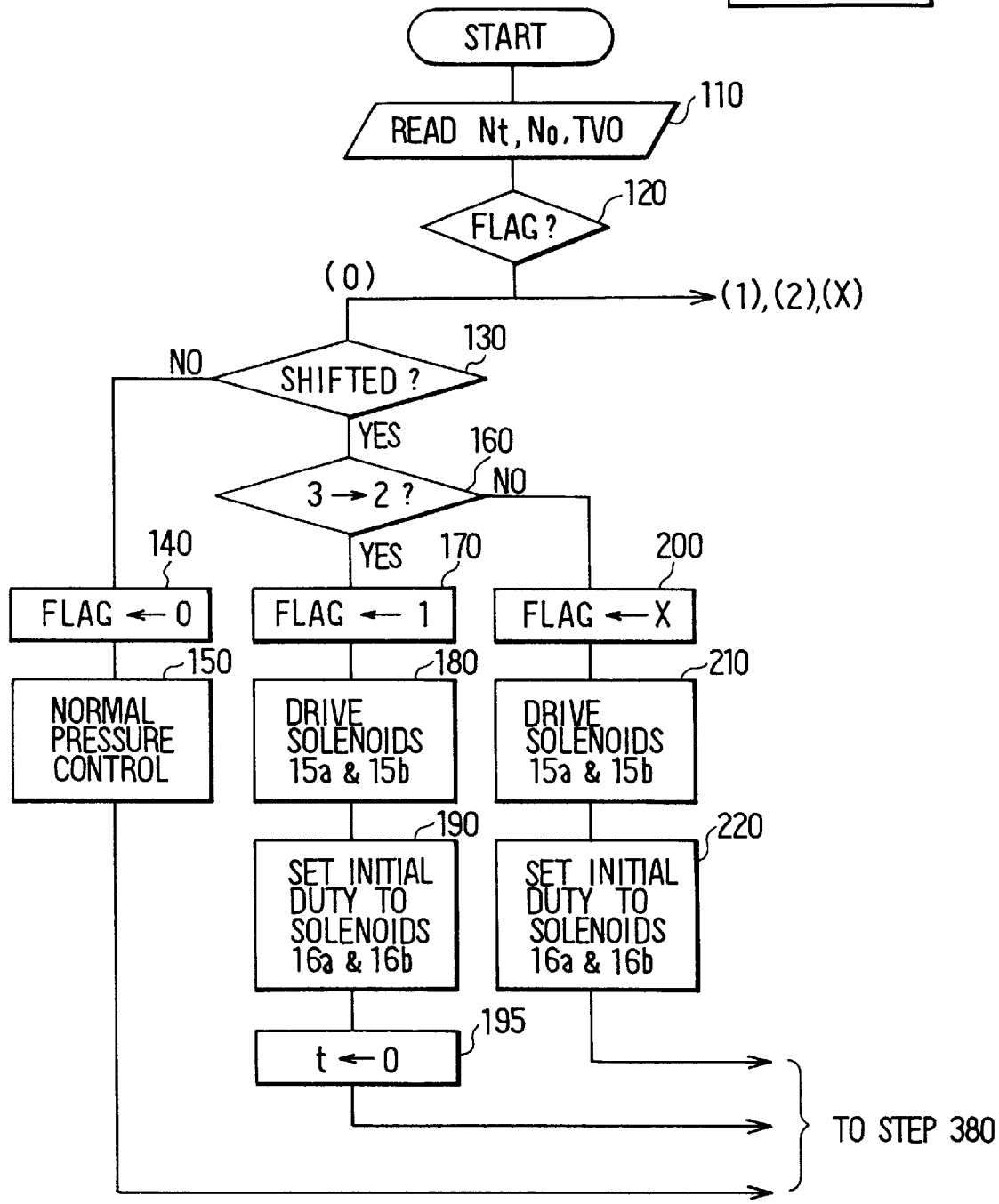

AUTOMATIC TRANSMISSION CONTROL HAVING VARIABLE FLUID PRESSURE DECREASING RATE AT GEAR SHIFTING

CROSS REFERENCE TO RELATED APPLICATION

This application relates to and incorporates herein by reference Japanese Patent Application No. 09-307559 filed on Nov. 10, 1997.

BACKGROUND OF THE INVENTION

1. Field of the Invention

The present invention relates to a method and system for controlling an automatic transmission, to perform hydraulic pressure control to various frictional engagement elements at the time of gear shifting.

2. Description of Related Art

Conventionally, an automatic transmission for a vehicle selects a predetermined gear by selectively hydraulically actuating various frictional engagement elements (clutches, brakes, and the like) of a gear ratio change mechanism and shifts the gear from one to another by changing operation of a frictional engagement element.

When working hydraulic pressure to the selected frictional engagement element is too high at the time of gear shift, transient engagement capacity of the frictional engagement element (transmission torque capacity) becomes excessive and a large gear shift shock occurs. On the contrary, when the working hydraulic pressure is too low, transient transmission torque capacity becomes too small, slip of the frictional engagement element increases and the life of the automatic transmission is shortened. Consequently, it is necessary to properly control the working hydraulic pressure.

Japanese Patent Publication No. 5-81793 teaches a disengagement control for frictional engagement elements. In this control, during a period until start of an effective gear shift, an instruction value for hydraulic pressure of a clutch to be disengaged is reduced at a predetermined change rate (gradient) as shown in FIG. 16.

Since the hydraulic pressure is decreased in order to detect a proper hydraulic pressure value, the gradient cannot be set steep. The pressure reduction time required to attain a predetermined hydraulic pressure varies between the cases where the hydraulic pressure is relatively low and high. As a result, the response time from the generation of the instruction of gear shift until the start of the effective gear shift varies. Therefore, for instance, in case of a kick-down gear shift for an acceleration, down-shift occurs only slowly or response time varies from vehicle to vehicle.

Japanese Patent Laid-Open No. 8-159266 (U.S. Pat. No. 5,643,124) teaches a timing control for an engagement side frictional engagement element. In this control, the timing of control is advanced as the vehicle speed is lower in consideration of a response delay from a hydraulic pressure instruction.

In this control as well, however, the timing of controlling the frictional engagement element on the engagement side is influenced by the variation in the hydraulic pressure characteristics in a manner similar to the control of the disengagement side frictional engagement element. That is, when the pressure reduction gradient is too steep for the instruction value, for example, as shown in FIG. 17, even if the start of the effective gear shift is detected and the pressure reduction instruction is canceled with the decrease in the hydraulic pressure in the disengagement side frictional engagement element, the hydraulic pressure is reduced more by an amount corresponding to the response delay.

Even in the case where there is a variation such that the hydraulic pressure applied in response to the instruction value is lower than the design value, as shown in FIG. 18 for example, the start of the effective gear shift cannot be detected also during the response delay time for the pressure reduction operation from the frictional engagement element, so that the pressure reduction is executed. Consequently, pressure reduction is carried out more than necessary.

In case of using a hydraulic control mechanism for generating hydraulic pressure at the gear shift transient time by also using an accumulator, the lower the pressure is, the larger the degree of occurrence of excessive pressure reduction is due to the operation delay of a piston for regulating the operation of the accumulator or the like.

SUMMARY OF THE INVENTION

It is an object of the present invention to provide an improved method and apparatus for controlling an automatic transmission, which can reduce variation in response time from an instruction of a gear shift until start of a effective gear shift.

According to the present invention, when a fluid pressure applied to a frictional engagement element which is changed from the engaged state to a disengaged state is controlled, a control instruction value is generated at a stage before an input shaft rotational speed starts to increase from a start of a down-shift control toward a value after completion of the gear shift. The control instruction value is set for gradually decreasing the fluid pressure applied to the frictional engagement element and controlling it so as to increase the ratio of decrease with elapsed of time.

BRIEF DESCRIPTION OF THE DRAWINGS

Other objects, features and advantages of the present invention will become more apparent from the following detailed description made with reference to the accompanying drawings. In the drawings:

FIGS. 3A and 3B are flowcharts of the main routine of a control process in the first embodiment;

DETAILED DESCRIPTION OF THE PREFERRED EMBODIMENT (First Embodiment)

Figure 1:
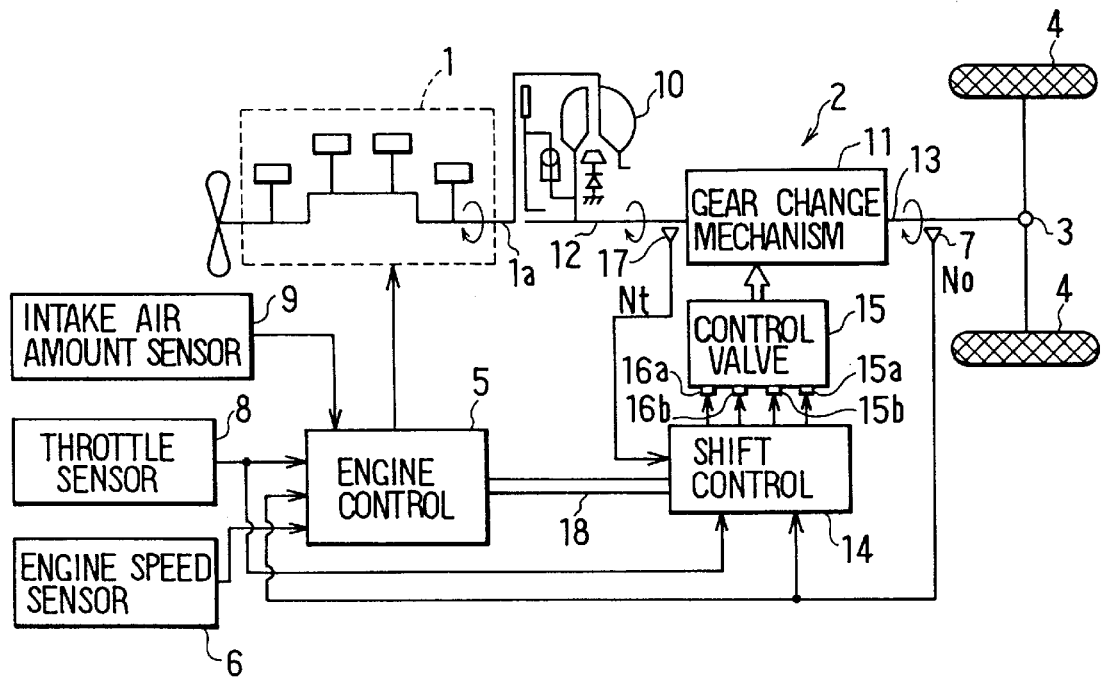
FIG. 1 is a schematic view showing an automatic transmission control system having therein a control apparatus according to a first embodiment of the present invention.

Referring first to FIG. 1, an electronically controlled engine 1 which is mounted on a vehicle is connected to driving wheels 4 via an automatic transmission 2 and a differential gear 3.

The engine 1 is provided with an engine control computer 5 to which signals from an engine speed sensor 6 for sensing the engine speed, a vehicle speed sensor 7 for sensing the speed of the vehicle (the output shaft rotational speed of the automatic transmission 2), a throttle sensor 8 for sensing the throttle opening angle of the engine 1, and an intake air amount sensor 9 for sensing an intake air amount are supplied.

The engine control computer 5 determines a fuel injection amount on the basis of the inputted information, sends instructions to the engine 1. In accordance with the instructions, a fuel supply apparatus (not shown) and an ignition system (not shown) operate so that fuel is supplied and burned by ignition sparks to drive the engine 1.

The automatic transmission 2 has a torque converter 10 and a gear change mechanism 11. The motive power supplied from the engine 1 is transmitted to an input shaft 12 of the gear change mechanism 11 via an engine output shaft 1a and the torque converter 10. The transmission input rotation to the input shaft 12 is accelerated or decelerated according to a selected gear position of the gear change mechanism 11 and the resultant rotation is transmitted to an output shaft 13. The rotation is transmitted from the output shaft 13 to the driving wheels 4 via the differential gear 3, thereby driving the automobile.

Figure 2:
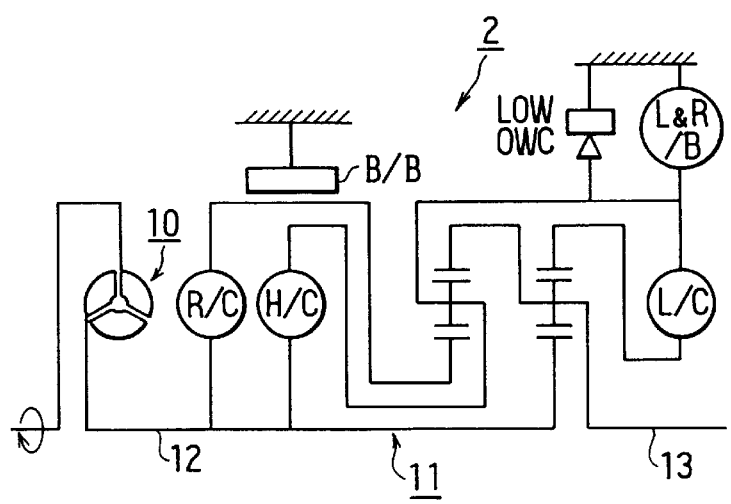
FIG. 2 is a schematic view showing an automatic transmission in the first embodiment.

As shown in FIG. 2, the gear change mechanism 11 has therein various frictional engagement elements such as various clutches (a reverse clutch R/C, a high clutch H/C, and a low clutch L/C) and brakes (a band brake B/B and a low and reverse brakes L&R/B) for determining a power transmission path (gear position) from the input shaft 12 to the output shaft 13.

LOW OWC is a one-way clutch which is connected in parallel with the L&R/B and operates to transmit the driving force from the engine side to the output shaft 13 at a predetermined gear position (for example, the first gear in the D range) which does not actuate the L&R/B but operates so as not to transmit the rotational force from the output shaft 13 to the engine side, thereby preventing an excessive operation of the engine braking.

Referring back to FIG. 1, a control valve unit 15 driven on the basis of an instruction from a gear shift control computer 14 is connected to the gear change mechanism 11. A hydraulic pressure is properly supplied from the control valve unit 15 and is used to actuate the various frictional engagement elements, thereby realizing the gear shift.

For the control valve unit 15, two gear shift controlling solenoids 15a and 15b which switch the paths for supplying the hydraulic pressure in accordance with the gear position based on the instruction of the gear shift control computer 14, a solenoid 16a for controlling the line pressure and a solenoid 16b for controlling the clutch pressure which controls the magnitude of the hydraulic pressure are arranged.

Although two gear shift controlling solenoids 15a and 15b are employed in the embodiment, the number of gear shift controlling solenoids can be increased according to the gear position or the construction of the control valve unit 15. A solenoid for regulating a timing for rapidly charging and discharging the working fluid at a gear change transition time can be also additionally used. The line pressure solenoid 16a and the clutch pressure solenoid 16b are duty solenoid type. However, they may be a linear solenoid type as long as the mechanism can vary the hydraulic pressure.

Although not illustrated, the computer 14 for controlling the gear shift takes the form of a microcomputer comprising a CPU, a ROM, a RAM, and an I/O device. Signals from an input shaft rotational speed sensor 17 for measuring the rotational speed of the input shaft 12 in addition to the vehicle speed sensor 7 and the throttle sensor 8 are supplied to the computer 14. The computer 14 determines whether conditions to change the gear are satisfied or not and performs various hydraulic controls based on the results of the determination.

Further, the engine control computer 5 and the gear shift computer 14 are connected via a communication line 18 so that control information and instructions can be bidirectionally transmitted. As the communication line 18, a multiplex communication system such as a LAN (Local Area Network) or wires for connecting input and output ports of th e control computers for each of necessary communications can be also used.

The gear shift computer 14 is programmed to execute control shown in FIGS. 3A, 3B, 4 and 5.

As shown in FIGS. 3A an d 3B, an input shaft rotational speed Nt, an output shaft rotational speed (vehicle speed) No, and a throttle opening angle TVO are read at step 110.

Subsequently, at step 120, the value of a "Flag" indicative of the state of the control is checked. According to the result of the check, the routine is branched and processes are executed as follows.

(i) Flag=0

When the value of Flag is "0" (the value of Flag is "0" when the gear shift computer 14 executes the program f or the first time), the program proceeds to step 130.

Figure 6:
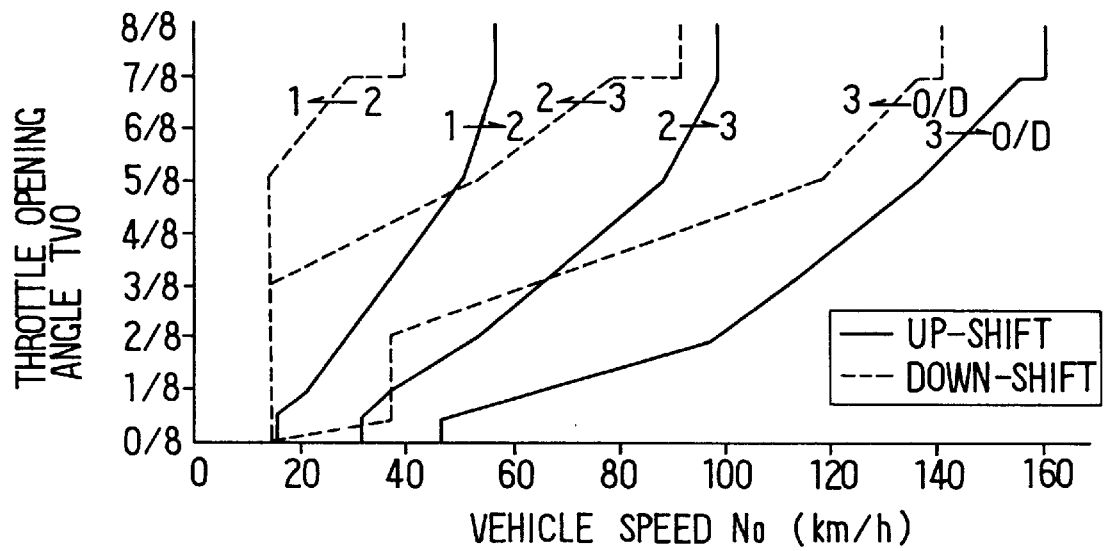
FIG. 6 is a graph showing gear shift characteristics of up-shift and down-shift in the first embodiment.

At step 130, whether the gear has been shifted or not is determined. For example, as shown in FIG. 6, the determination is made on the basis of a shift pattern determined by the preliminarily programmed relation between the vehicle speed No and the throttle opening angle TVO.

That is, the gear shift computer 14 checks in which zone the present operating state lies in the shift pattern by using signals from the vehicle speed sensor 7 and the throttle sensor 8 and determines the gear position. In the shift pattern, in order to prevent repeated switching of gear positions upon determination of the gear position, different lines such as solid lines each indicating a gear shift (up-shift) from the (n)th speed (n=1, 2, 3) to the (n+1)th speed and broken lines each indicating a gear shift (down-shift) from the (m)th speed (m=2, 3, 4) to the (m−1)th speed are used. As a result, when it is determined that the gear has been shifted, the routine advances to step 160. When it is determined that the gear has not been shifted, the routine advances to step 140.

At step 140, the value of Flag is reset again to "0" so as to indicate a stationary state of no gear shift.

At step 150, a hydraulic control in the normal time which is not in the gear-change transition time is executed. The control is carried out to operate each of the gear shift control solenoids 15a and 15b, the line pressure solenoid 16a, and the clutch pressure solenoid 16b so as to maintain the present gear position.

On the other hand, at step 160 in the case where it is determined that the gear has been shifted, whether the gear shift is from the third gear to the second gear (3→2) or not is checked.

In the case of the 3→2 gear shift, first at step 170, the value of Flag is set to "1" in order to indicate that the routine advanced to the first half of the transient control of the 3→2 gear shift (i.e., a period from the gear shift instruction until the effective gear shift) for the following arithmetic operation period.

The routine advances to step 180 and the gear shift control solenoids 15a and 15b are driven according to the gear position in the following table 1. In order to set the gear position to the second gear this time, the gear shift control solenoid 15a is set to be "OFF" and the gear shift control solenoid 15b is set to be "ON". By this operation, the working fluid is discharged from the high clutch H/C and is charged to the band brake B/B in accordance with the clutch engagement table 1.

TABLE 1

| Gear position | solenoid 15a for gear shift control | Solenoid 15b for gear shift control |
|---|---|---|
| 1st speed | ON | ON |
| 2nd speed | OFF | ON |
| 3rd speed | OFF | OFF |
| 4th speed | ON | OFF |

Table 2 shows the operations of the clutches for the respective gear positions. Circles indicate the engagement state and no mark denotes the disengagement state. Each of the operations is achieved by the working hydraulic pressure supplied by the control valve unit 15.

TABLE 2

| Friction elements | | R/C | H/C | L/C | B/B | L & R/B | LOW OWC |
|---|---|---|---|---|---|---|---|
| Gear Position | Reverse | ○ | | | ○ | | |
| | D range 1st | | | | ○ | | ○ |
| | 2nd | | | ○ | ○ | | |
| | 3rd | | ○ | ○ | | | |
| | 4th | | ○ | | ○ | | |
| Engine brake | 1st | | | | ○ | ○ | (○) |
| | 2nd | | | ○ | ○ | | |
| | 3rd | | ○ | ○ | | | |
| | 4th | | ○ | | ○ | | |

Subsequent to the working of the gear shift control solenoids 15a and 15b, the routine advances to step 190 where initial duty instruction values as control instruction values of the line pressure solenoid 16a and the clutch pressure solenoid 16b are set.

The hydraulic pressure to the high clutch H/C is controlled by the line pressure solenoid 16a and the hydraulic pressure to the band brake B/B is controlled by the clutch pressure solenoid 16b. The initial value of the line pressure is set so that the hydraulic pressure is decreased to a predetermined level in order to disengage the high clutch H/C which has been engaged at the third gear. Simultaneously, the band brake B/B is prepared to be engaged, that is, the initial value of the clutch pressure control is set so that charging of the working fluid to the working hydraulic pressure path is finished by the time the disengagement of the high clutch H/C progresses to a predetermined state and the hydraulic pressure is held at the level at which the torque cannot be transmitted yet.

Figure 3B:
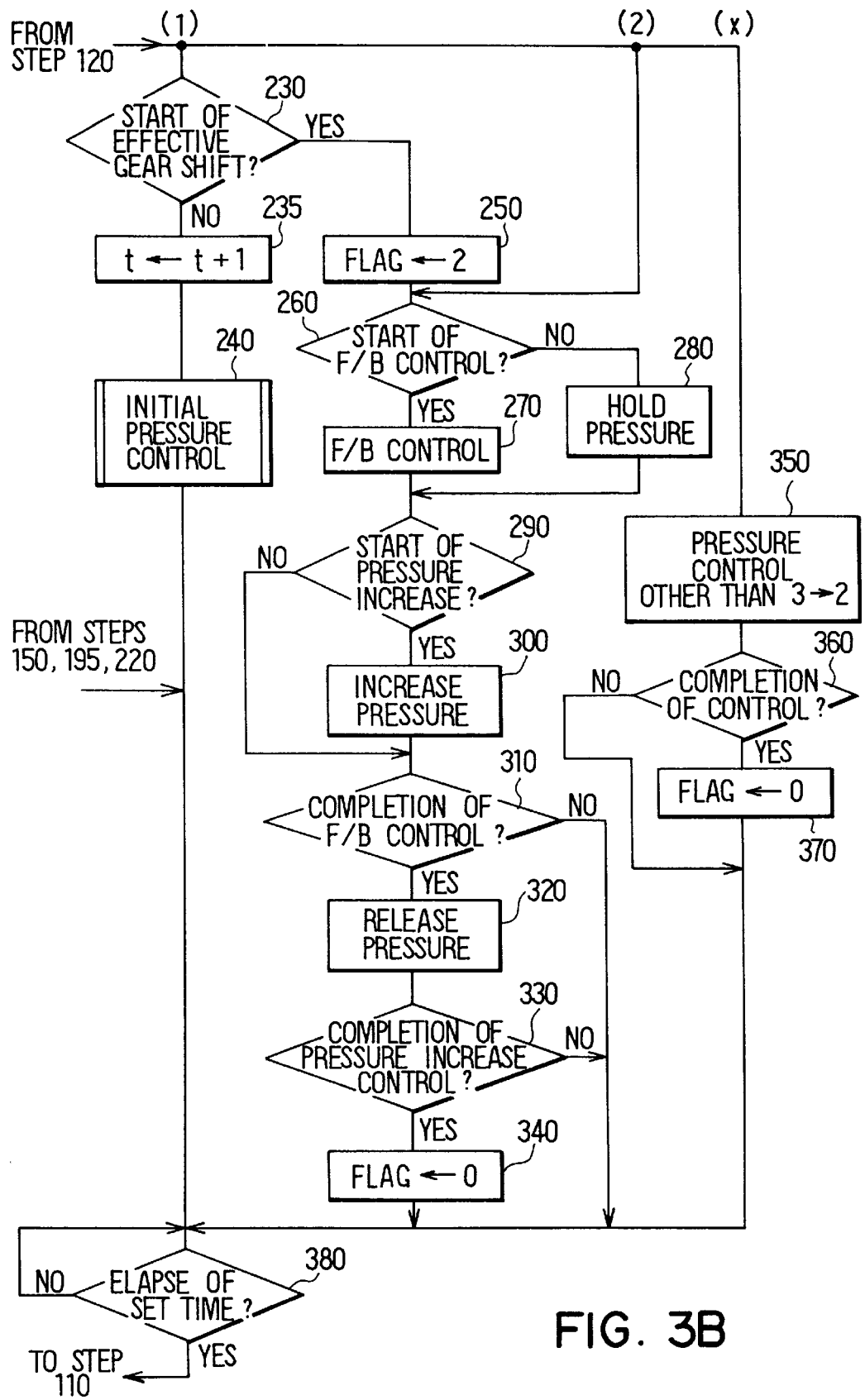

After that, a counter (t) for measuring a sweep period is reset at step 195 and the routine advances to step 380 (FIG. 3B).

On the other hand, in case of the gear shift control except for the 3→2 gear shift by the check at step 160, the program proceeds to step 200 and the gear shift control except for the 3→2 gear shift is executed.

That is, at step 200, in order to show a control of another gear position, the value of Flag is set to (x). For instance, in case of a 2→1 gear shift, the value of (x) is set to 3.

At the following step 210, in order to perform another gear shift, gear change control solenoids 15a and 15b are switched as shown in the table 1.

At step 220, the initial values (initial duty values) of the line pressure solenoid 16a and the clutch pressure solenoid 16b are set. After that, the routine advances to step 380 (FIG. 3B).

(ii) Flag=1

When the value of Flag is determined as "1" at step 120, the routine advances to step 230 where a control in the sweep period before the value of the input shaft rotational speed actually changes to a value after the gear shift, that is, before the effective gear shift is executed. That is, a gear shift initial hydraulic pressure control from just after the gear shift instruction until the start of effective gear shift is carried out.

At step 230, the start of the effective gear shift is detected. The start of the effective gear shift is detected by using the input shaft rotational speed Nt, the output shaft rotational speed No, the gear ratio Gr before the gear shift, and a predetermined speed difference threshold ΔN when the following expression (1) is satisfied.

$$\Delta Nt - No \cdot Gr \geq \Delta N \tag{1}$$

When it is detected that the effective gear shift has not been started yet, the counter (t) is increased at step 235.

Then, the gear shift initial hydraulic pressure control at step 240 is executed. After that, the program proceeds to step 380, on the other hand, when the start of the effective gear change is detected, the routine advances to step 250 to execute the hydraulic pressure control during the effective gear shift period.

At step 250, the value of Flag is set to "2" indicative of the control during the effective gear shifting period.

The routine advances to step 260 and whether the start condition of a feedback (F/B) control of the hydraulic pressure applied to the frictional engagement elements (for instance, the high clutch H/C in case of the 3→2 gear shift) to be disengaged for making the input shaft rotational speed Nt during the effective gear shift period trace the target value Ntr is satisfied or not is checked.

Figure 4:
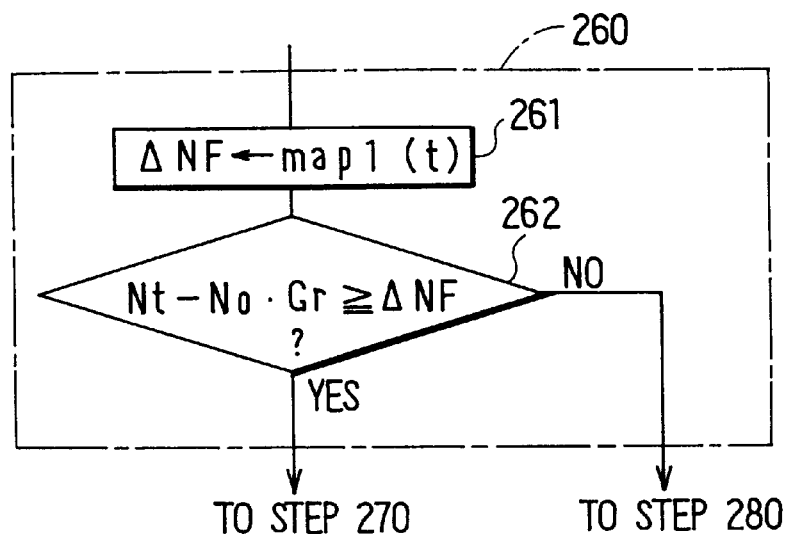
FIG. 4 is a flowchart showing a feedback control determining process in the first embodiment.

The process of step 260 is shown in detail in FIG. 4. The value of mapl(t) is set to ΔNF at step 261 and the check is made by the following expression (2) at step 262.

$$Nt-No\cdot Gr \geq \Delta NF \tag{2}$$

Figure 12A:
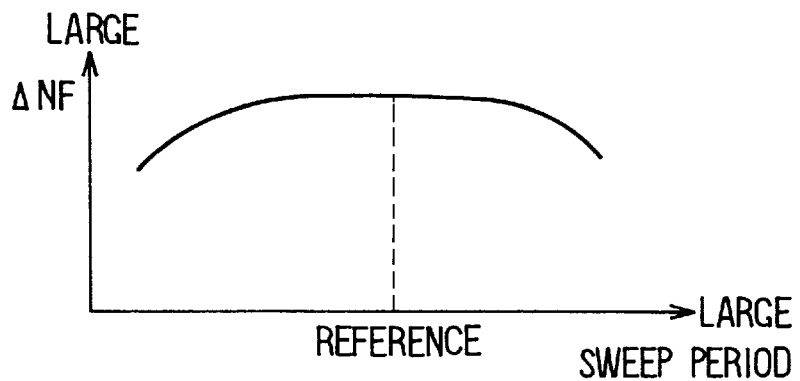
FIG. 12A is a graph showing the relation between a sweep period and ΔNF in the first embodiment.

The mapl (t) is retrieved by a table lookup, and the threshold ΔNF can be set according to the sweep period (t) as shown in FIG. 12A. ΔNF is a predetermined threshold satisfying ΔNF≧ΔN.

The processing routine advances to either the F/B control at step 270 or a hydraulic pressure holding control at step 280 in accordance with the result of the check at step 260.

At step 290, whether it is a start timing of a control for increasing a working hydraulic pressure to the frictional engagement element to be engaged (for example, the band brake B/B in case of the 3→2 gear shift) or not is determined by the following expression (3).

$$No\cdot GrN-Nt \leq \Delta NZ \tag{3}$$

where, grN is a gear ratio after completion of the gear shift and ΔNZ denotes a predetermined threshold for determination.

Only when the expression (3) is satisfied, the hydraulic pressure increasing control is performed to the frictional engagement element to be engaged at step 300 and the routine advances to step 310.

At step 310, whether or not a completion condition of the hydraulic pressure F/B control of the frictional engagement element to be disengaged is satisfied or not is checked by using the following expression (4).

$$No\cdot GrN-Nt \leq \Delta NFE \tag{4}$$

ΔNFE is a predetermined threshold satisfying ΔNZ≧ΔNFE.

Only when the expression (4) is satisfied, a complete release of the hydraulic pressure to the frictional engagement element to be disengaged is instructed at step 320, thereby finishing a transient hydraulic pressure control (F/B control at inertia phase) to the frictional engagement element to be disengaged.

Further, the routine advances to step 330 and whether the hydraulic pressure increasing control to the frictional engagement element to be engaged has been completed or not is checked. That is, it is determined whether or not the hydraulic pressure instruction value has reached a value which is preset based on the input torque (or, simply, the throttle opening angle).

In the case where it is determined that the hydraulic pressure increasing control has been finished, the value of Flag is set to "0" at step 340, thereby finishing the gear shift transient hydraulic pressure control. After that, the routine advances to step 380.

(iii) Flag=2

When the value of Flag is determined as "2" at step 120, since it is already determined that the effective gear shift has been started, the processes at steps 230 and 250 are skipped and the processes at steps 260 to 340 are similarly carried out. After that, the routine advances to step 380.

(iv) Flag=x

When the value of Flag is set to a value (x) except for 0, 1, and 2 at step 120, the processing routine advances to step 350 where an hydraulic pressure control in a gear shift transient time except for the 3→2 gear shift is executed.

The control in this case is similar except that the frictional engagement element as an object is changed. In this case as well, the gear shift control is time sequentially progressed while changing the value of Flag in accordance with the gear shift transient state. The value of Flag is set to "0" at the end of the control (step 370), thereby finishing the transient control.

After the above procedure, the routine advances to step 380. At step 380, a timing regulation for allowing the control to be executed at predetermined time intervals is performed. The predetermined time denotes an arithmetic operation period and is determined on the basis of response speeds of the solenoids, response characteristics of the working hydraulic pressure to each of the frictional engagement elements by the control valve unit 15, the torque transmission characteristics of the frictional engagement element, and the like. It is set within a range of about 8 to 32 msec (10 msec in the embodiment).

After an elapse of the set time, the control routine returns to step 110 and similar operations are repeatedly executed.

Figure 5:
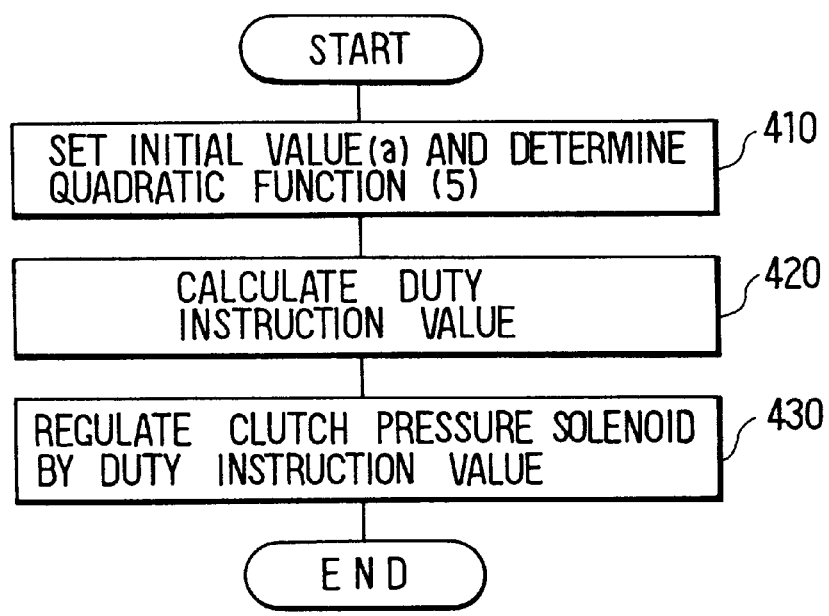
FIG. 5 is a flowchart showing a process of a gear shift initial hydraulic pressure control in the first embodiment.

The above gear shift initial hydraulic pressure control at step 240 is shown in detail in FIG. 5. In this step, the duty instruction value to the clutch pressure solenoid 16b is outputted so as to be reduced at a ratio according to a quadratic function of time as shown by the following expression (5) in accordance with the manner shown in FIG. 7. Consequently, a target fluid pressure is reduced at a ratio according to a quadratic function.

$$\text{duty instruction value} = \text{initial value} - a \cdot t^2 \tag{5}$$

where, (a) denotes a coefficient of the quadratic function and (t) is time.

Figure 7:
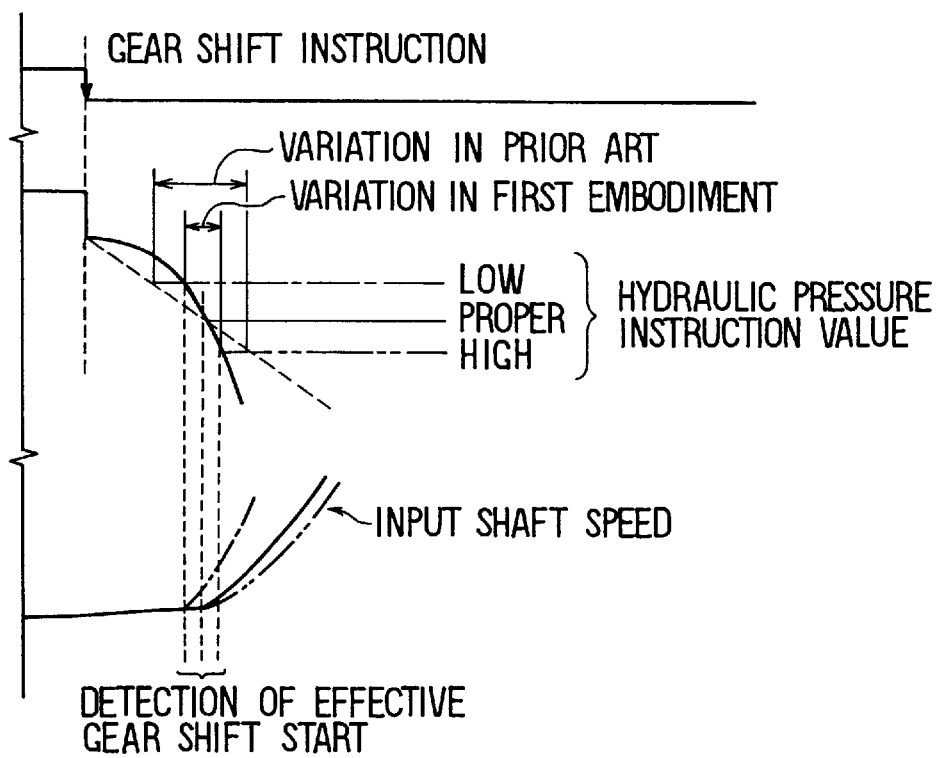
FIG. 7 is a time chart showing a target fluid pressure and a gear shift state in the first embodiment.

As described above in detail, the hydraulic pressure instruction value (duty instruction value) as a control instruction value is outputted so as to obtain a target hydraulic pressure as shown by a quadratic curve in FIG. 7. Consequently, since the gradient of a graph showing the target hydraulic pressure is steep just before the start of the effective gear shift, a variation in the start of the effective gear shift can be reduced irrespective of the hydraulic pressure.

In this case, therefore, as shown in FIG. 5, the target hydraulic pressure which is changed with a step just after the gear shift instruction is set to an initial value at step 410 and the value of the coefficient (a) is set according to a desired quadratic curve.

Since the quadratic function is accordingly determined, at step 420, the time at the gear shift instruction is set to "0" and an elapsed time since the gear shift instruction is substituted for (t), thereby calculating the duty instruction value by the expression (5).

After that, at step 430, the duty ratio of a voltage applied to the clutch pressure solenoid 16b is regulated on the basis of the duty instruction value, thereby controlling the hydraulic pressure applied to the frictional engagement element to be disengaged.

Figure 8:
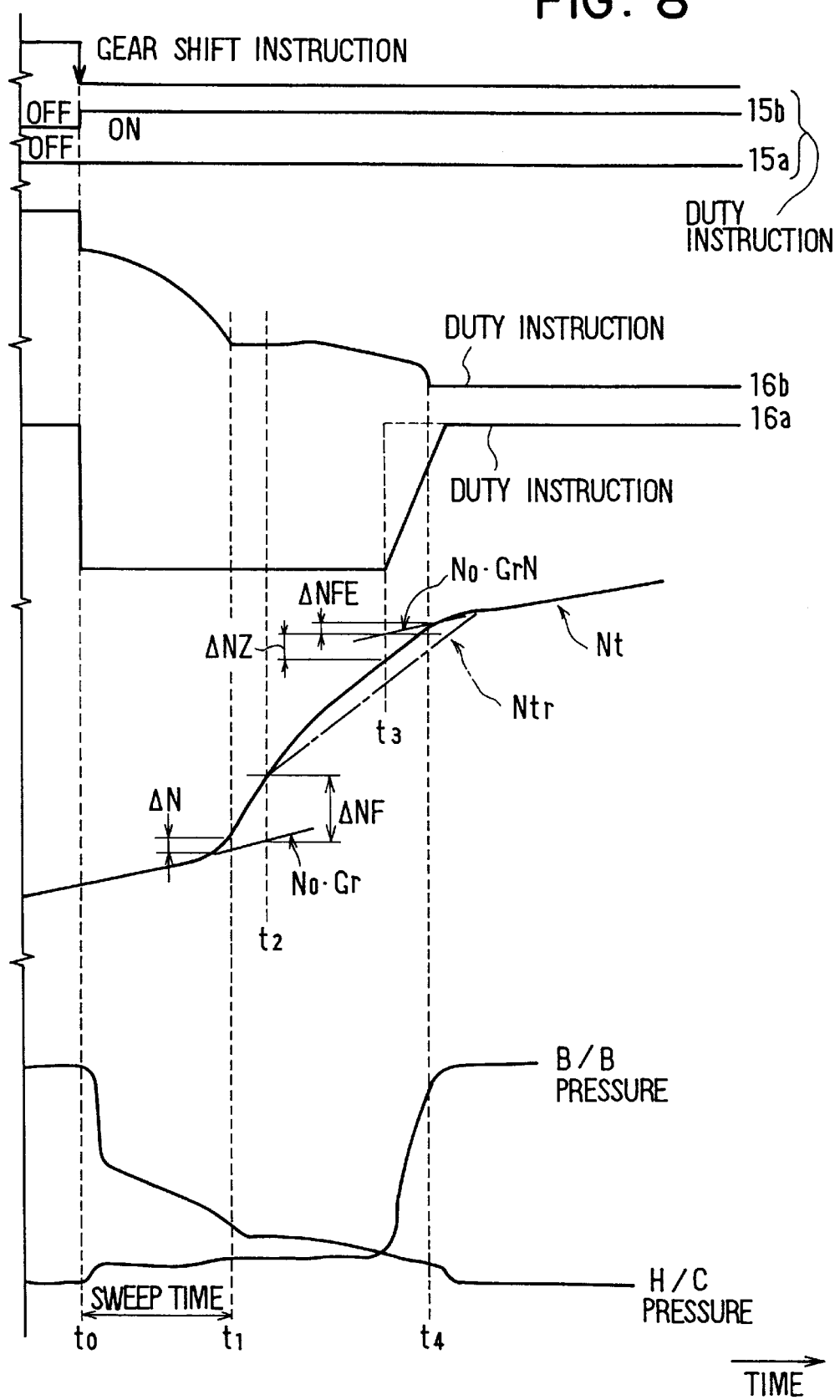
FIG. 8 is a time chart showing a gear shift state in the first embodiment.

The first embodiment operates as shown in FIG. 8.

First, in accordance with the gear shift instruction at time t0, the gear shift control solenoids 15a and 15b are switched and the initial values of the line pressure solenoid 16a and the clutch pressure solenoid 16b are set.

After that, the duty instruction value of the clutch pressure solenoid 16b is outputted so as to decrease the target fluid pressure at a rate according to the quadratic function of time as shown by the expression (5).

The determination of the effective gear shift start of the expression (1) is made successively (step 230) and the pressure reduction is continued until the time point t1 at which the determination is made (step 240).

When the condition of the expression (1) is satisfied, the transmission torque capacity of the high clutch H/C which has been engaged and is disengaged becomes below the input torque by reduction of the clutch hydraulic pressure and the excessive torque is therefore used to accelerate the rotational speed of the rotary element connected to the input shaft 12. Thus, the rotational speed of the input shaft 12 becomes higher than that of the output shaft 13 free from the relation of the mechanical gear ratio.

From the time point t2 when the input shaft rotational speed Nt increases and the condition of the F/B control start of the expression (2) is satisfied (step 260), the hydraulic pressure of the clutch to be disengaged is F/B controlled so that the input shaft rotational speed Nt traces the target input shaft rotational speed Ntr or the change in the input shaft rotational speed Nt traces the change in the target input shaft rotational speed Ntr. As the F/B control, a known PID (proportional-integral-differential) control or the like can be applied.

Figure 17:
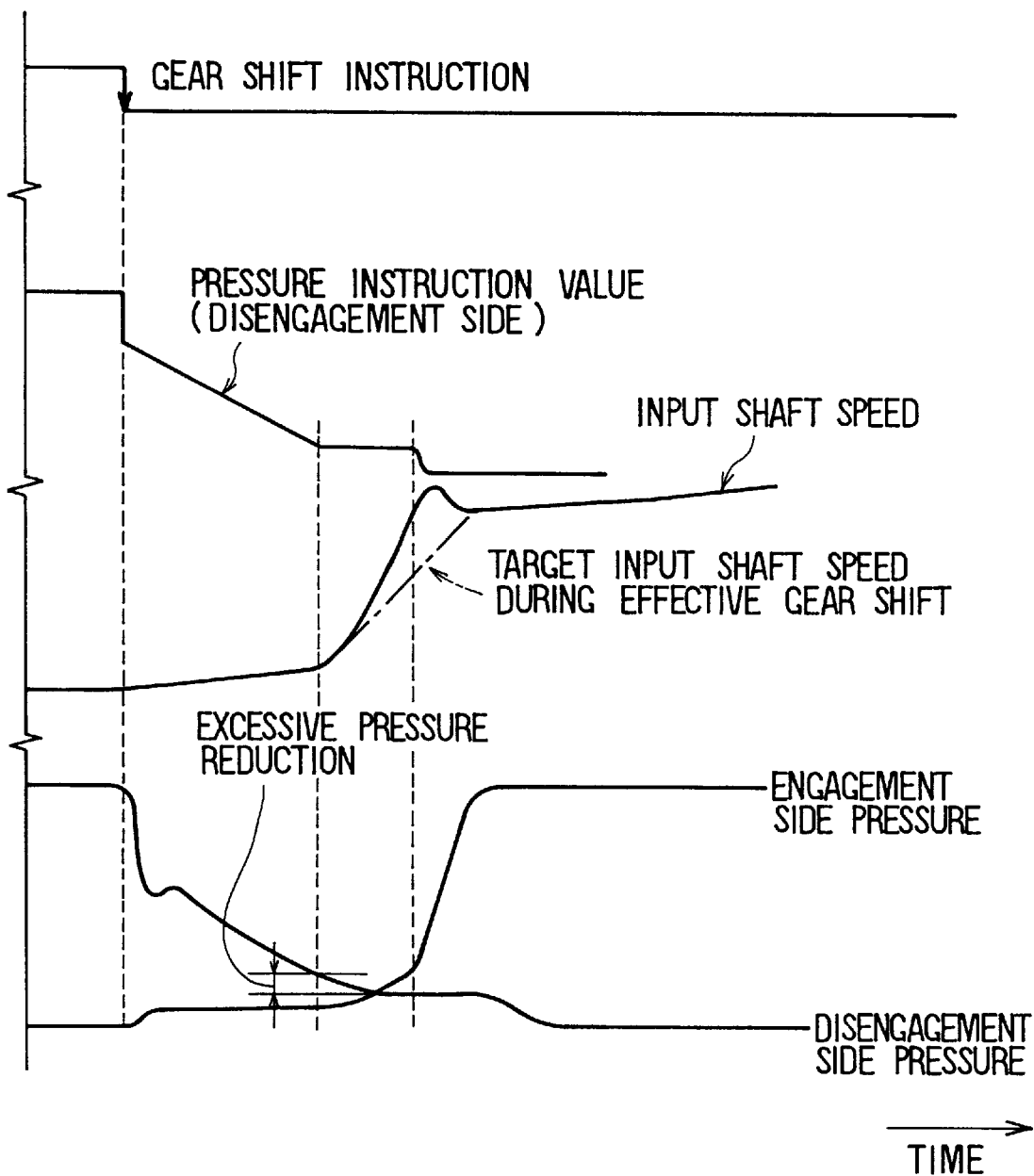
FIG. 17 is a time chart showing another conventional gear shift operation.

In this case, the threshold is changed in the expressions (1) and (2). This is because that, as shown in FIG. 17, the F/B control does not properly operate due to the transient response of the hydraulic system at time point t1 when the input shaft rotational speed Nt starts to change to satisfy the condition of the expression (1).

That is, a period in which the pressure reduction cannot be stopped in the way as intended just after the pressure reduction instruction is suddenly canceled for the hydraulic pressure to the clutch to be disengaged exists. Even if the F/B control is started in the period, the hydraulic pressure does not properly react, so that an excessive output for compensating the F/B control is generated. In order to prevent the unnecessary operation of the F/B control, the threshold $\Delta NF$ larger than $\Delta N$ is set in the embodiment.

In the determination period by $\Delta NF$, the control instruction value (hydraulic pressure instruction value) at time point t1 where the expression (1) is satisfied is held for the purpose that the hydraulic control by the feedback is waited.

Because of the above reason, depending on the response speed of the hydraulic system, the F/B control can be also started simultaneously with the determination of $\Delta NF=\Delta N$, namely, the start of the effective gear shift by the expression (1).

The gear shift progresses further and a control for increasing the pressure to the band brake B/B serving as an engagement side frictional engagement element is started at time point t3 since this is executed at the timing when the transmission torque capacity of the high clutch H/C as the disengagement side clutch becomes sufficiently small and the gear shift is almost finished.

That is, as the transmission torque capacity of the frictional engagement element to be disengaged decreases, the rotational speed of the engine as a driving source, namely, the input shaft rotational speed Nt increases. If the state is left as it is, the input shaft rotational speed Nt increases more and more. Since the operating hydraulic pressure to the disengagement side frictional engagement element is, however, held to a degree at which a torque can be transmitted by the F/B control to a certain degree, the input shaft rotational speed Nt does not increase freely.

When the increased input shaft rotational speed Nt approaches a synchronous rotational speed after the gear shift, the transmission torque capacity of the frictional engagement element to be engaged is increased and the working hydraulic pressure to the frictional engagement element to be engaged is increased so that the sum of the transmission torque capacities of the frictional engagement elements on both of the disengagement and engagement sides including the transient response of the hydraulic pressure increase coincides with the input torque. Thus, the gear shift which does not cause a shock so much can be preferably realized. The threshold $\Delta NZ$ is determined so as to realize such a gear shift.

The method of increasing the hydraulic pressure instruction value to the engagement side frictional engagement element at a predetermined gradient after calculation of the expression (3) is used in the embodiment. Depending on the transient response of the hydraulic system (when the response is slow), however, a method of increasing the hydraulic pressure instruction value with a step as shown by a broken line (of the duty instruction value of the clutch pressure solenoid 16a) in FIG. 8 can be also employed.

After that, the gear shift transient control is substantially regarded to be ended at time point t4 where the relation of the expression (4) using the input shaft rotational speed Nt and the threshold $\Delta NFE$ set in consideration of the increase time amount of the working hydraulic pressure based on the hydraulic instruction to the frictional engagement element to be engaged is satisfied. The instruction of reducing the working hydraulic pressure is sent so that the frictional engagement element to be disengaged is completely disengaged.

The above is the fundamental operation by the control of the embodiment. A method for setting the threshold $\Delta NF$ for determining a start of the F/B control and a control accompanying the setting method as a characteristic of the embodiment will be described.

As shown in FIG. 7, the hydraulic pressures in respective devices are reflected in the period (sweep period) from the instruction of the gear shift until the start of the effective gear shift. That is, the higher the hydraulic pressure value is than the set value, the longer the sweep period is. When the sweep period is either longer as shown by the two-dot chain line in FIG. 7 or shorter as shown by the one-dot chain line than a reference value shown by a solid line, the state of excessive pressure reduction is conspicuous as shown in FIGS. 17 and 18.

Figure 18:
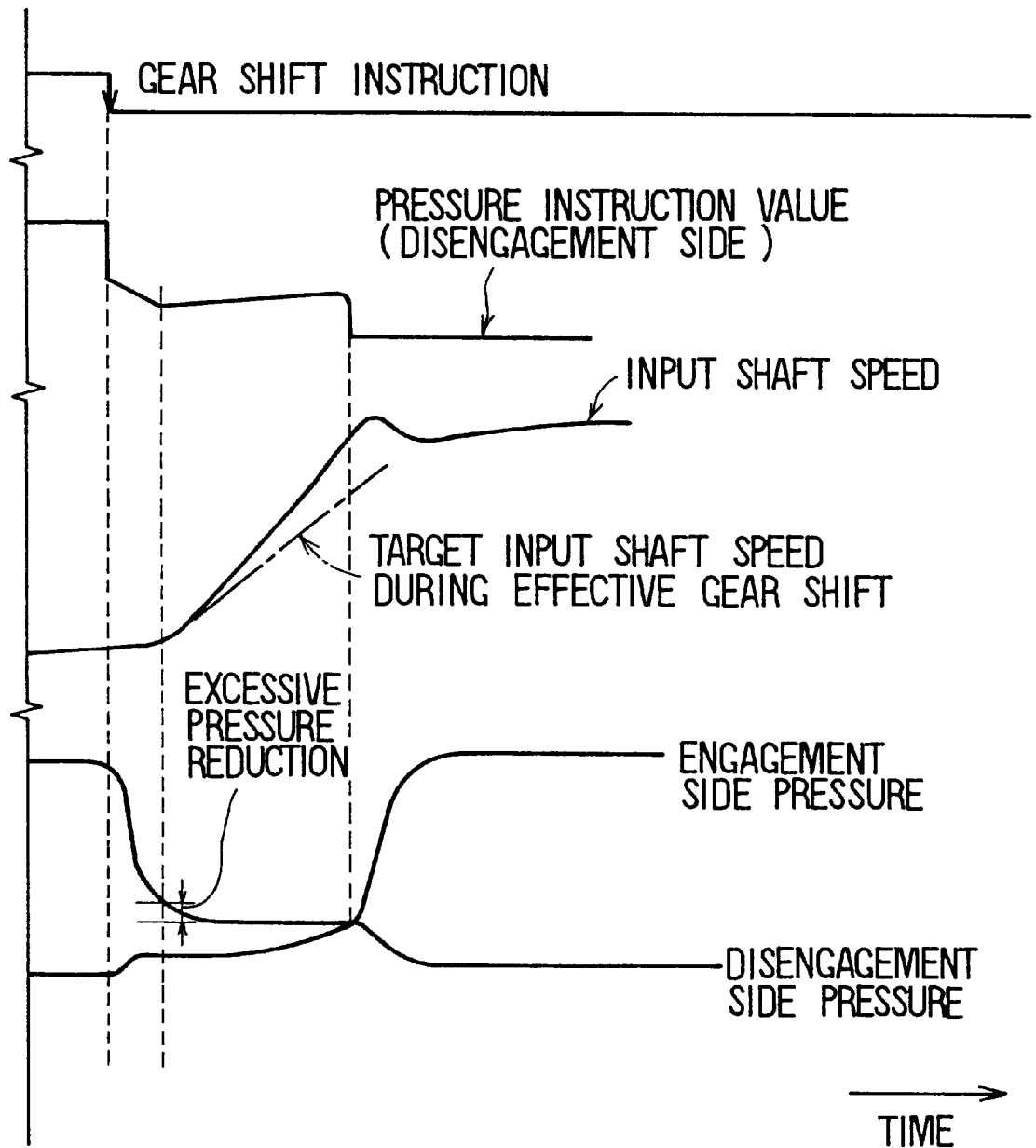
FIG. 18 is a time chart showing a still another conventional gear shift operation.

That is, when the pressure is decreased from a high pressure at a rate gradient in a state shown in FIG. 17 or when the pressure is low from the beginning as shown in FIG. 18, it is difficult to increase and return the pressure to a proper hydraulic pressure due to the hydraulic pressure which has been already too low during the effective gear shift period. As a result, it is difficult to make the input shaft rotational speed Nt during the effective gear shift period accurately trace the target input shaft rotational speed Ntr, so that the rotational speed Nt increases at a relatively steep gradient, thereby causing a gear shift shock to occur.

As a countermeasure, in the embodiment, the time (sweep period) from the gear shift instruction to the effective gear shift is measured by a counter (t) at step 240. The larger the difference between the sweep period and the reference time, the more the timing to start the F/B control for making the input shaft rotational speed Nt trace the target value Ntr is advanced.

For instance, as shown in FIG. 12A, the sweep period is compared with the reference. The larger the difference is, the more the threshold for determining the start of the F/B control is reduced, thereby advancing the start timing of the F/B control during the effective gear shift period.

That is, a certain time is necessary so that the F/B control effectively operates in consideration of, for instance, a response delay in the hydraulic system. Consequently, when the pressure is excessively reduced, the state in which the gear shift progresses rapidly by the excessive pressure reduction is suppressed by advancing the state in which the F/B control is effectively performed as much as possible.

According to the embodiment, in the sweep period from the gear shift instruction to the start of the effective gear shift, the target fluid pressure to the high clutch H/C as a disengagement side clutch is controlled to change according to the quadratic function. That is, the duty instruction value is generated to the line pressure solenoid 16*a* so as to increase the rate of decrease of the target fluid pressure with an elapse of time.

When the fluid pressure is too high for the variation in the working hydraulic pressure, the rate of pressure reduction is advanced. On the contrary, when the fluid pressure is too low, the effective gearshift is started in a period during which the pressure reduction rate is slow. Consequently, the detection interval of the start of the effective gear shift is shortened and the variation in the response time can be reduced.

As a result, for example, in the case of the kick-down gear shift caused by the acceleration intended by the driver, the reaction time of the down-shift becomes the same, so that the response time does not vary according to vehicles or driving operations and the driver does not feel incongruous.

According to the embodiment, since the duty instruction value is generated so that the ratio of decrease of the target fluid pressure becomes smooth at the first stage after the gear shift instruction, the actual hydraulic pressure of the high clutch H/C is not reduced excessively.

As a result, the response delay by the rapid decrease in the actual hydraulic pressure and the occurrence of the gear shift shock upon engagement due to the response delay can be prevented.

Further, in the embodiment, the larger the difference between the sweep period and the reference time is, the more the threshold $\Delta NF$ for determining the start of the F/B control is reduced, thereby advancing the start timing of the F/B control.

Thus, when the pressure is excessively reduced, the F/B control is advanced so as to operate effectively as much as possible and the state in which the gear shift progresses rapidly due to the excessive pressure reduction, thereby enabling the occurrence of the gear shift shock to be prevented.

(Second Embodiment)

In this embodiment, by making the gradient of the target input shaft rotational speed Ntr of the F/B control in the effective gear shift period to reduce, occurrence of the gear shift shock due to the excessive pressure reduction is prevented.

Figure 9:
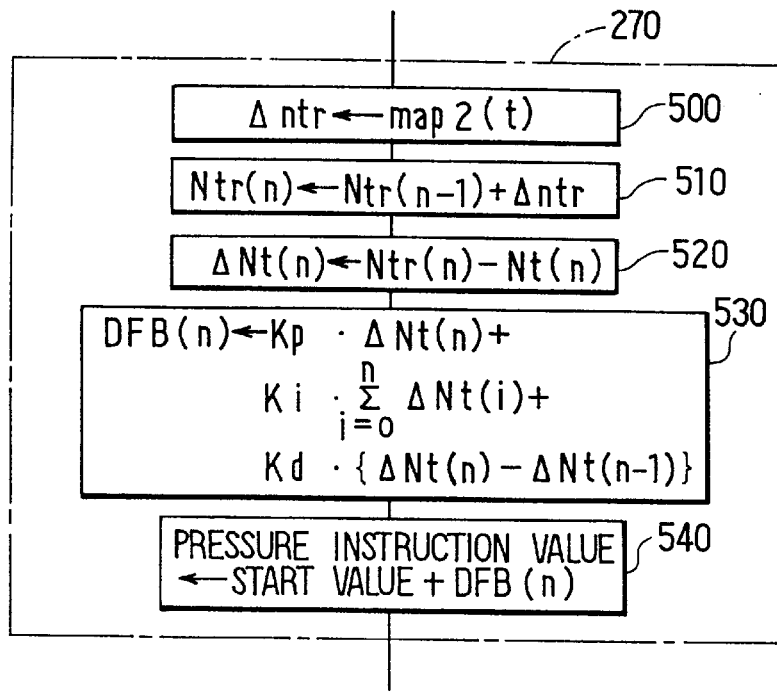
FIG. 9 is a flowchart showing a feedback control process according to a second embodiment of the present invention.

A control process of the embodiment is similar to the process of FIG. 3 in the first embodiment but is characterized in that the process shown in FIG. 9 is employed as the process at step 270.

First, at step 500 in FIG. 9, a gradient $\Delta ntr$ of the F/B control is obtained by using map2(t). The map2(t) is retrieved by a table lookup executed by using, for instance, FIG. 12B. The gradient $\Delta ntr$ can be set according to the sweep period (t).

At the following step 510, the gradient $\Delta ntr$ is added to a previous target input shaft rotational speed Ntr(n−1), thereby calculating the target input shaft rotational speed Ntr(n) at this time.

At step 520, an actual input shaft rotational speed Nt(n) is subtracted from the target input shaft rotational speed Ntr(n), thereby calculating a deviation $\Delta Nt(n)$ of the rotational speed.

At step 530, a compensation output DFB(n) for the F/B control at time (n) is calculated by the following equation (6).

$$DFB(n) = Kp \cdot \Delta Nt(n) + Ki \cdot \sum_{i=0}^{n} Nt(i) + Kd \cdot \{\Delta Nt(n) - \Delta Nt(n-1)\} \quad (6)$$

where, Kp, Ki, and Kd are constants showing gains of a proportional term, an integral term, and a differential term, respectively.

At step 540, the compensation output DFB(n) is added to the start value to calculate the hydraulic pressure instruction value. The start value of the hydraulic pressure instruction is reduced by the sweep control on the basis of the expression (5) and the resultant value corresponds to the hydraulic pressure instruction value at time t1 in FIG. 8.

Figure 12B:
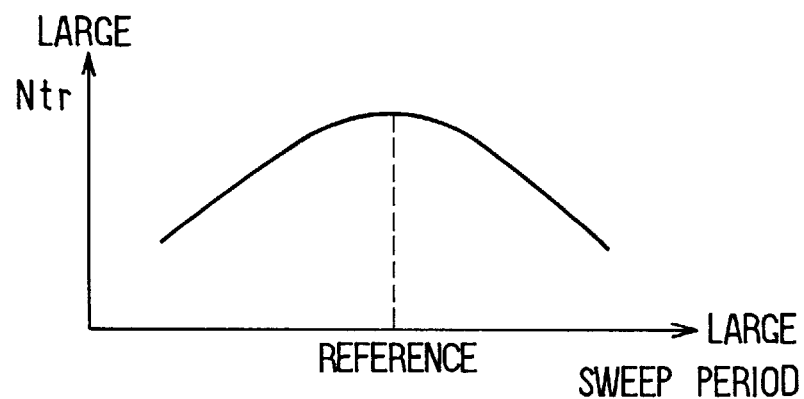
FIG. 12B is a graph showing the relation between a sweep period and a gradient of Ntr in the second embodiment.

That is, in the embodiment, as shown in FIG. 12B for instance, a control is carried out in such a manner that the larger the difference between the sweep period and the reference is, the target value Ntr of the F/B control for making the input shaft rotational speed Nt trace the target value Ntr is set at a smaller gradient.

In this manner, when the actual input shaft rotational speed gradient is steep, the output of the F/B control is increased, thereby enabling the gradient of the input shaft rotational speed to be made more smooth. Consequently, the state where the gear shift rapidly progresses due to the excessive pressure reduction is suppressed and the occurrence of the gear shift shock upon engagement can be prevented.

(Third Embodiment)

According to this embodiment, by increasing a gain of the F/B control in the effective gear shift period, the occurrence of the gear shift shock due to excessive pressure reduction is prevented.

Figure 10:
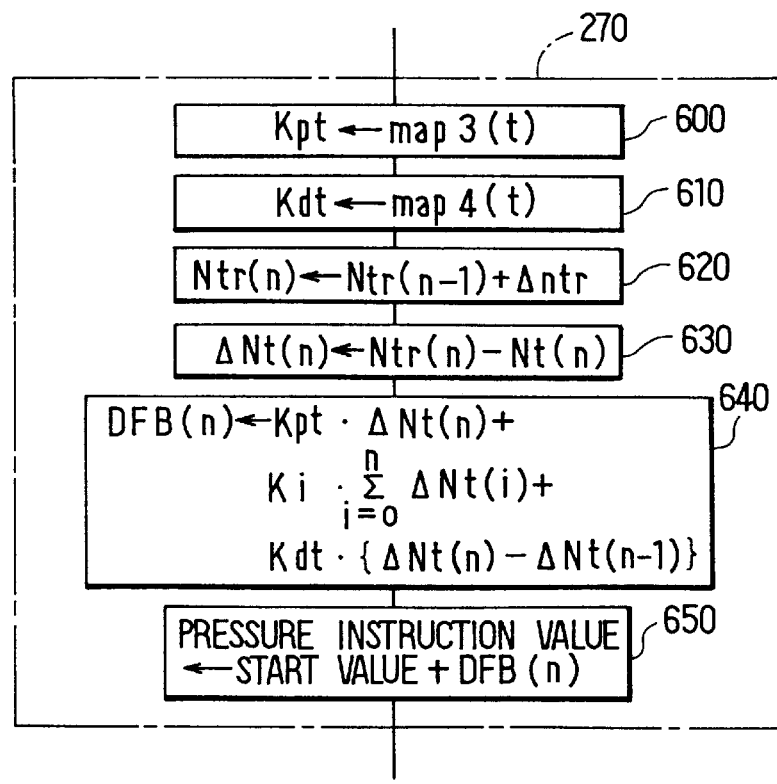
FIG. 10 is a flowchart showing a feedback control process according to a third embodiment of the present invention.

A control process of the embodiment is similar to the process of FIG. 3 in the first embodiment but is characterized in that the process shown in FIG. 10 is employed as the process at step 270.

First, at step 600 in FIG. 10, a proportional term gain Kpt in the F/B control is obtained by using map3(t). map3(t) may be retrieved by a table lookup using a map for the proportional term gain. This is representatively shown in FIG. 12C and the proportional term gain Kpt can be set according to the sweep period (t).

At the following step 610, a differential term gain Kdt in the F/B control is obtained by using map4(t). map4(t) is also retrieved by a table-look up using a map for the differential term gain. This is representatively shown in FIG. 12C and the differential term gain Kdt can be set according to the sweep period (t).

At step 620, a gradient $\Delta ntr$ (constant) is added to a previous target input shaft rotational speed Ntr(n−1), thereby obtaining a target input shaft rotational speed Ntr(n) at this time.

At step 630, an actual input shaft rotational speed Nt(n) is subtracted from the target input shaft rotational speed Ntr(n), thereby calculating a deviation $\Delta Nt(n)$ of the rotational speed.

At step 640, a compensation output DFB(n) for the F/B control at time (n) is calculated by the following equation (7).

$$DFB(n) = Kpt \cdot \Delta Nt(n) + Ki \cdot \sum_{i=0}^{n} Nt(i) + Kdt \cdot \{\Delta Nt(n) - \Delta Nt(n-1)\} \quad (7)$$

At step 650, the compensation output DFB(n) is added to the start value to calculate the hydraulic pressure value. The start value of the hydraulic pressure instruction is reduced by the sweep control on the basis of the expression (5) and the resultant value corresponds to the hydraulic pressure instruction value at the time t1 in FIG. 8.

Although a constant is used as the gradient Δntr in this case, it can be changed according to the sweep period (t) as shown in FIG. 9 in the second embodiment.

Figure 12C:
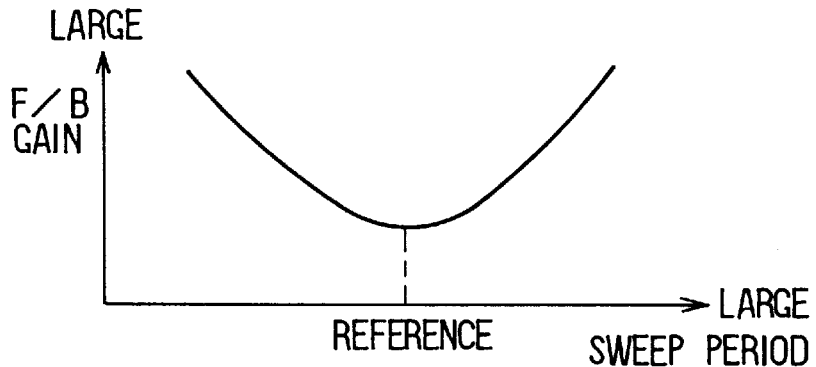
FIG. 12C is a graph showing the relation between a sweep period and a gain of an F/B control in the third embodiment.

That is, in the third embodiment, as shown in FIG. 12C for instance, the larger the difference between the sweep period and the reference is, the higher the gain of the control for making the input shaft rotational speed Nt trace the target value Ntr is set.

In this manner, when the actual input shaft rotational speed gradient is steep, the output of the F/B control is increased, thereby enabling the gradient of the input shaft rotational speed to be made more gentle. Consequently, the state where the gear shift rapidly progresses due to the excessive pressure reduction is suppressed and the occurrence of the gear shift shock upon engagement can be prevented.

(Fourth Embodiment)

In the fourth embodiment, by increasing the threshold ΔNZ for determining the start timing of a control for increasing the working hydraulic pressure to the engagement side frictional engagement element, the occurrence of the gear shift shock due to the excessive pressure reduction is prevented.

Figure 11:
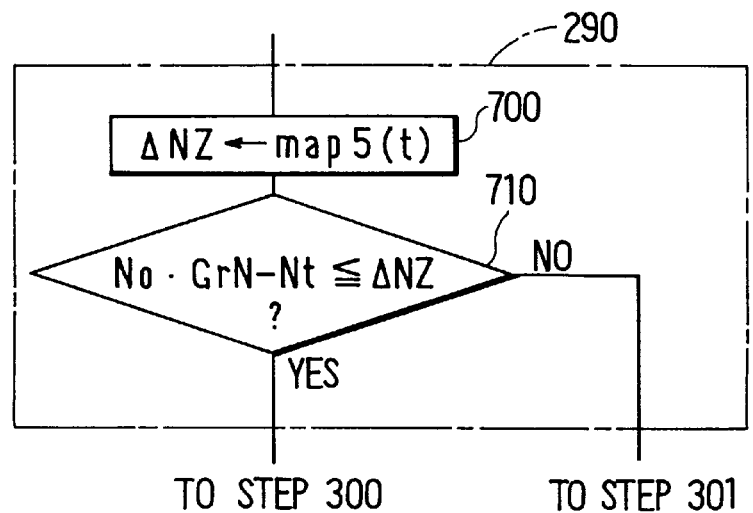
FIG. 11 is a flowchart showing a process for determining a start of an engagement side pressure increasing control according to a fourth embodiment of the present invention.

A control process of the embodiment is similar to that of FIG. 3 of the first embodiment but is characterized in that the process shown in FIG. 11 is employed as the process of step 270.

Figure 12D:
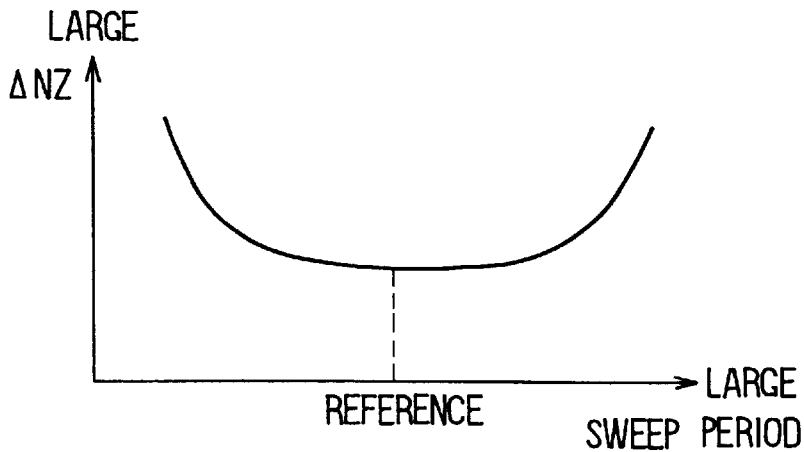
FIG. 12D is a graph showing the relation between a sweep period and ΔNZ in the fourth embodiment.

First, at step 700 in FIG. 11, the threshold ΔNZ for determining the F/B control is obtained by using map5(t). map5(t) is, for instance, retrieved by a table look up executed by using FIG. 12D, by which the threshold ΔNZ can be set according to the sweep period (t).

At step 710, whether it is the start timing of the control for increasing the working hydraulic pressure to the engagement side frictional engagement element or not is determined by the expression (3).

That is, according to the embodiment, as shown in FIG. 12(d) for instance, the larger the difference between the sweep period and the reference is, the larger the threshold ΔNZ for determining the start of increasing the pressure becomes in order to advance the start timing of the control for increasing the hydraulic pressure to the band brake B/B as the frictional engagement element to be engaged.

In this manner, even if the transmission torque capacity is small due to the excessive pressure reduction in the frictional engagement element to be disengaged (the high clutch H/C), the shortage of the transmission torque capacity is compensated by increasing the pressure to the frictional engagement element to be engaged (the band brake B/B), thereby enabling the occurrence of the large shock at the end of the gear shift to be prevented.

(Fifth Embodiment)

The fifth embodiment relates to a case where the hydraulic pressure is applied to the frictional engagement element by using an accumulator.

Figure 13:
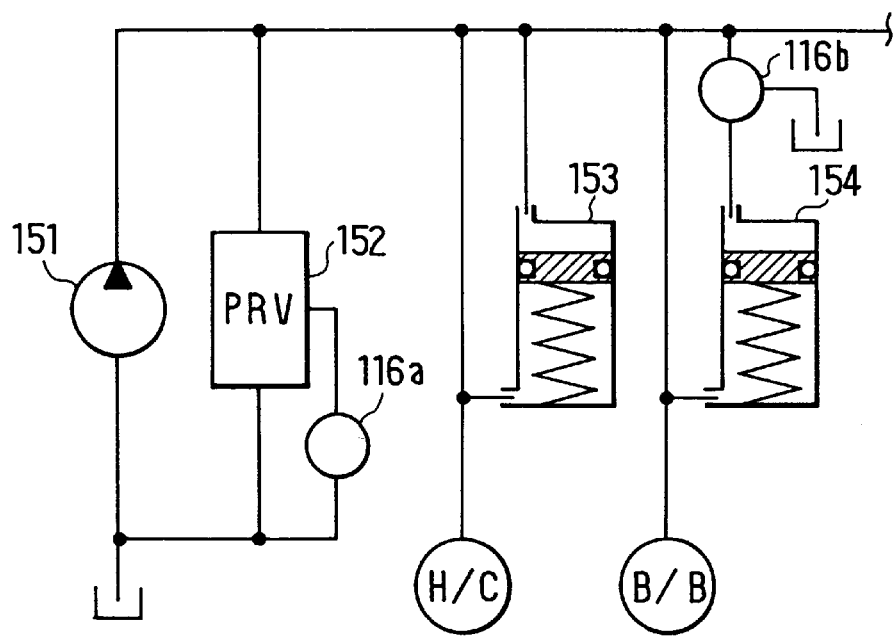
FIG. 13 is a schematic view showing a fluid pressure control apparatus for an automatic transmission according to a fifth embodiment of the present invention.

As shown in FIG. 13, in addition to the high clutch H/C as the disengagement side frictional engagement element and the band brake B/B as the engagement side frictional engagement element, an oil pump 151, a pressure regulator valve 152, an H/C accumulator 153, and a B/B accumulator 154 are provided.

The high clutch H/C makes a clutch hydraulic pressure from a line pressure by introducing a hydraulic pressure based on a line pressure regulated by a line pressure controlling solenoid 116a as a back pressure of the H/C accumulator 152. On the other hand, the band brake B/B makes a clutch hydraulic pressure from the line pressure independently from the working hydraulic pressure of the high clutch H/C by introducing a hydraulic pressure regulated by a clutch pressure controlling solenoid 116b as a back pressure of the B/B accumulator 154.

In case of using the H/C accumulator 153 and the B/B accumulator 154, there is the possibility that a control delay occurs in parts such as pistons used for operating the accumulators 153 and 154 from their characteristics. It is therefore very difficult to increase the pressure with a high response speed in a pressure reduced state when the back pressure is decreased.

When the high pressure is decreased at a steep gradient in a state shown in FIG. 17 or when the pressure is low from the begining as shown in FIG. 18, it is difficult to increase and return the hydraulic pressure to a proper hydraulic pressure during the effective gear shift since the pressure is already too low. As a result, it is difficult to make the input shaft rotational speed Nt in the effective gear shift period accurately trace the target input shaft rotational speed Ntr, so that the rotational speed Nt increases at a relatively steep gradient.

In this embodiment as well, in a manner similar to the foregoing first to fourth embodiments, the situation is dealt with by changing the start timing or method of the feedback control or a control around a synchronization point.

As mentioned above in detail, there is a case that the hydraulic pressure is excessively decreased for the frictional engagement element according to respective devices. When the hydraulic pressure introduced to the frictional engagement elements are set by using the accumulators 153 and 154, the excessive pressure reduction becomes more conspicuous. In this embodiment, even in case of the automatic transmission using the accumulators 153 and 154, the variation in the reaction time and the gear shift shock can be prevented.

It will be obviously understood that the invention is not limited by the foregoing embodiments and can be carried out in various modes without departing from the technical scope of the invention.

Figure 14:
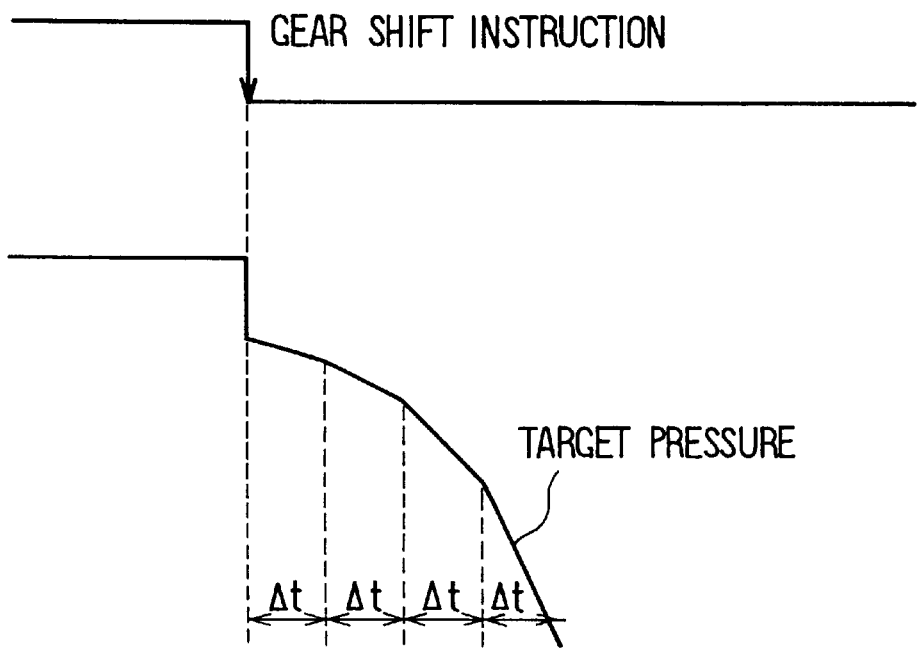
FIG. 14 is an explanatory diagram showing a method of setting a target fluid pressure according to another embodiment of the present invention.

Although the control instruction value is generated so as to change the target hydraulic pressure according to the quadratic function in the first embodiment, for instance, as shown in FIG. 14, the control instruction value for changing the gradient of the target hydraulic pressure can be also outputted every predetermined time. This case has an advantage that the arithmetic operation is reduced.

Figure 15:
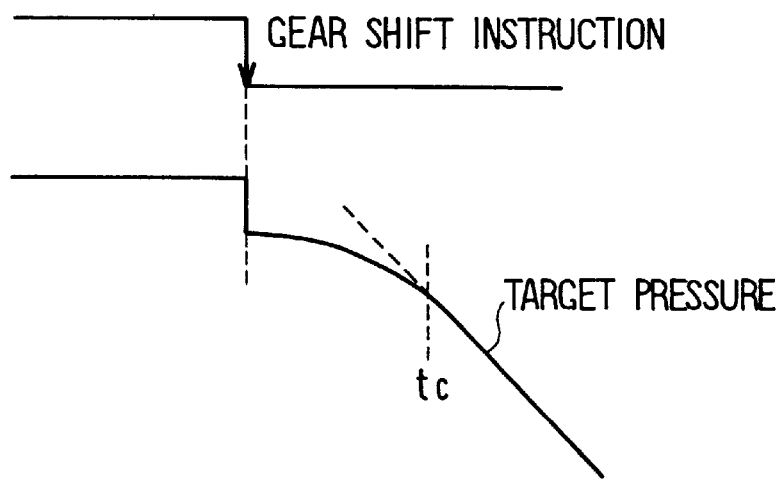
FIG. 15 is an explanatory diagram showing a method of setting a target fluid pressure in the other embodiment of the present invention.
Figure 16:
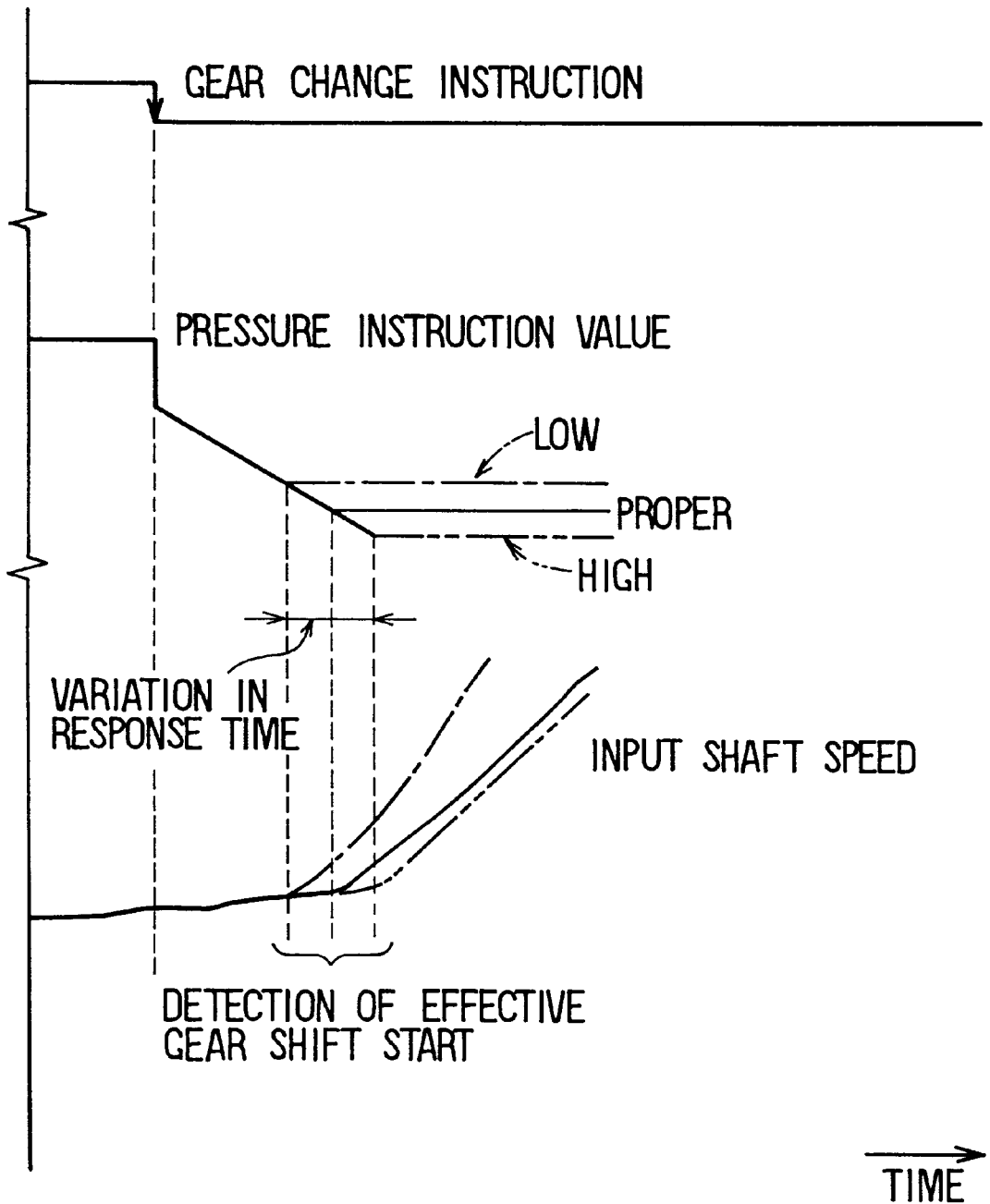
FIG. 16 is a time chart showing a conventional gear shift operation.

Further, as shown in FIG. 15, in the pressure reduction control of the target hydraulic pressure to the disengagement side frictional engagement element according to the quadratic function, at a predetermined pressure reduction gradient at the time tc when the pressure reduction gradient reaches a predetermined value and after that, the predetermined gradient can be held. In this case, effects similar to those of the first to fifth embodiments are obtained and the hydraulic pressure can be prevented from being reduced at an unnecessarily steep gradient.

A control for decreasing the torque of the engine can be also executed around the end of the effective gear shifting period.

What is claimed is:

1. An automatic transmission control system comprising:
    a gear change mechanism having an input shaft for receiving an engine rotation force, an output shaft for driving wheels of a vehicle, and frictional engagement elements selectively engageable by hydraulic fluid;

engagement switching means for selecting, from the frictional engagement elements, a frictional engagement element, an engagement condition of which is to be switched for a gear down-shift;

pressure control means for controlling pressure of the hydraulic fluid to be applied to the selected frictional engagement element; and initial pressure control means for outputting a control instruction value to the pressure control means for reducing gradually pressure applied to the selected frictional engagement element before rotational speed of the input shaft rises from a control start of the down-shift, the rate of the reduction of the control instruction value being increased with time.

2. A control system as in claim 1, wherein the initial pressure control means generates the control instruction value to cause the pressure to be at least a quadratic function with respect to time.

3. An automatic transmission control system comprising:

a gear change mechanism having an input shaft for receiving an engine rotation force, an output shaft for driving wheels of a vehicle and frictional engagement elements selectively engageable by hydraulic fluid;

engagement switching means for selecting, from the frictional engagement elements, a frictional engagement element, an engagement condition of which is to be switched for a gear down-shift;

pressure control means for controlling pressure of the hydraulic fluid to be applied to the selected frictional engagement element; and initial pressure control means for outputting a control instruction value to the pressure control means for reducing gradually pressure applied to the selected frictional engagement element before rotational speed of the input shaft rises from a control start of the down-shift, the rate of the reduction of the control instruction value being increased with time;

wherein the initial pressure control means generates the control instruction value to cause the rate of reduction to change at every repeat of a predetermined interval.

4. An automatic transmission control system comprising:

a gear change mechanism having an input shaft for receiving an engine rotation force, an output shaft for driving wheels of a vehicle and frictional engagement elements selectively engageable by hydraulic fluid;

engagement switching means for selecting, from the frictional engagement elements, a frictional engagement element, an engagement condition of which is to be switched for a gear down-shift, pressure control means for controlling pressure of the hydraulic fluid to be applied to the selected frictional engagement element; and initial pressure control means for outputting a control instruction value to the pressure control means for reducing gradually pressure applied to the selected frictional engagement element before rotational speed of the input shaft rises from a control start of the down-shift, the rate of the reduction of the control instruction value being increased with time;

wherein the initial pressure control means generates the control instruction value to cause the rate of reduction to be fixed to a predetermined value after the rate of reduction attains the predetermined value.

5. An automatic transmission control system comprising:

a gear change mechanism having an input shaft for receiving an engine rotation force, an output shaft for driving wheels of a vehicle, and frictional engagement elements selectively engageable by hydraulic fluid;

engagement switching means for selecting, from the frictional engagement elements, a frictional engagement element, an engagement condition of which is to be switched for a gear down-shift;

pressure control means for controlling pressure of the hydraulic fluid to be applied to the selected frictional engagement element; and initial pressure control means for outputting a control instruction value to the pressure control means for reducing gradually pressure applied to the selected frictional engagement element before rotational speed of the input shaft rises from a control start of the down-shift, the rate of the reduction of the control instruction value being increased with time;

means for measuring a time period from the control start for the down-shift to the start of rise in the rotational speed of the input shaft;

means for comparing the measured time period with a reference; and means for changing, in response to a comparison output of the comparing means, the control of the pressure control means during a gear shift, thereby suppressing an excessive rise in the rotational speed of the input shaft.

6. A control system as in claim 5, wherein:

the changing means changes the control of the pressure control means so that the rise in the rotational speed is suppressed more as the difference between the measured time period and the reference becomes larger.

7. A control system as in claim 5, wherein:

the means for changing changes control of the pressure control means so that timing of starting causes the rotational speed of the input shaft to follow a target speed.

8. A control system as in claim 5, wherein:

the means for changing changes a control gradient of the pressure control means so that a control target value for causing the rotational speed of the input shaft to follow a target speed is reduced.

9. A control system as in claim 5, wherein:

the means for changing changes control gain of the pressure control means so that a control gain for causing the rotational speed of the input shaft to follow a target speed is increased.

10. A control system as in claim 5, wherein:

a start-time for applying a fluid pressure control to an additional one of said frictional engagement elements is varied in response to a difference between the measured time and the reference.

11. A control system as in claim 10, wherein:

the start timing is advanced more as the difference between the measured time period and the reference becomes larger.

12. A control method for an automatic transmission which has a gear change mechanism having an input shaft for receiving an engine rotation force, an output shaft for driving wheels of a vehicle, and frictional engagement elements selectively engageable by hydraulic fluid, the method comprising:

selecting, from the frictional engagement elements, a frictional engagement element, an engagement condition of which is to be switched for a gear down-shift;

controlling pressure of the hydraulic fluid to be applied to the selected frictional engagement element; and outputting a control instruction value to the pressure control means for reducing gradually pressure applied to the selected frictional engagement element before rotational speed of the input shaft rises from a control start of the down-shift, the rate of the reduction of the control instruction value being increased with time.

13. An automatic transmission control system comprising:

a gear change mechanism having an input shaft for receiving an engine rotation force, an output shaft for driving wheels of a vehicle, and frictional engagement elements selectively engageable by hydraulic fluid;

engagement switching means for selecting, from the frictional engagement elements, a frictional engagement element, an engagement condition of which is to be switched for a gear down-shift; and pressure control means for controlling pressure of the hydraulic fluid to be applied to the selected frictional engagement element, wherein the pressure control means includes initial pressure control means for gradually reducing pressure of the hydraulic fluid to be applied to the selected frictional engagement element until the input shaft rotational speed rises toward a completion rotational speed to be attained at a completion of a down-shift, and the pressure control means further includes speed rise control means for controlling input shaft rotational speed increase based on a time period required from start of the down-shift to start of an increase in the input shaft rotational speed, thereby controlling the input shaft rotational speed to the speed at completion of down-shifting.

14. A control system as in claim 13, wherein:

the speed rise control means suppresses increases in input shaft rotational speed more as the difference between the required time period and a reference becomes larger.

* * * * *